United States Patent
Alperovich et al.

(10) Patent No.: US 11,010,171 B2
(45) Date of Patent: May 18, 2021

(54) EFFICIENT OUT OF PROCESS RESHUFFLE OF STREAMING DATA

(71) Applicant: Microsoft Technology Licensing, LLC, Redmond, WA (US)

(72) Inventors: Alexander Alperovich, Redmond, WA (US); Zhong Chen, Medina, WA (US); Boris Shulman, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/426,683

(22) Filed: May 30, 2019

(65) Prior Publication Data

US 2020/0379774 A1    Dec. 3, 2020

(51) Int. Cl.
| | |
|---|---|
| *G06F 15/173* | (2006.01) |
| *G06F 9/38* | (2018.01) |
| *G06F 16/27* | (2019.01) |
| *G06F 16/25* | (2019.01) |

(52) U.S. Cl.
CPC .......... *G06F 9/3851* (2013.01); *G06F 16/254* (2019.01); *G06F 16/278* (2019.01)

(58) Field of Classification Search
CPC .... G06F 9/3851; G06F 16/278; G06F 16/254; G06F 9/3855; G06F 16/27
USPC ................. 709/231, 232, 203, 217
See application file for complete search history.

(56) References Cited

U.S. PATENT DOCUMENTS

| | | | |
|---|---|---|---|
| 6,449,688 B1* | 9/2002 | Peters ................. | G06F 11/1076 711/112 |
| 2013/0179540 A1* | 7/2013 | Isozu ..................... | H04L 67/02 709/218 |
| 2015/0244820 A1* | 8/2015 | Verkasalo ............... | H04L 67/22 707/740 |
| 2017/0235288 A1* | 8/2017 | Tsujide .............. | G05B 19/0426 700/86 |
| 2018/0317156 A1* | 11/2018 | Bergstrom .............. | H04L 47/26 |
| 2018/0343550 A1* | 11/2018 | Murai ..................... | H04W 4/38 |
| 2019/0121716 A1* | 4/2019 | Kurmus .................. | G06F 21/52 |

(Continued)

OTHER PUBLICATIONS

Cheng, et al., "On the Performance and Convergence of Distributed Stream Processing via Approximate Fault Tolerance", In Journal of the Computing Research Repository, Nov. 12, 2018, 24 Pages.

(Continued)

*Primary Examiner* — Kaylee J Huang
(74) *Attorney, Agent, or Firm* — Fiala & Weaver P.L.L.C.

(57) ABSTRACT

Methods, systems, apparatuses, and computer program products are provided for processing a stream of data. A maximum temporal divergence is established for data flushed to a data store from a plurality of upstream partitions. Each of a plurality of data flushers, each corresponding to an upstream partition, may obtain an item of data from a data producer. Each data flusher may determine whether flushing the data to the data store would exceed the maximum temporal divergence. Based at least on determining that flushing the data to the data store would not exceed the maximum temporal divergence, the data may be flushed to the data store for ingestion by a downstream partition and a data structure (e.g., a ledger) may be updated to indicate a time associated with the most recent item of data flushed to the data store.

20 Claims, 5 Drawing Sheets

(56) References Cited

U.S. PATENT DOCUMENTS

2020/0097505 A1\* 3/2020 Ishida .................. G06F 3/0619
2020/0119975 A1\* 4/2020 Yoneda ................ H04L 67/125

OTHER PUBLICATIONS

Fernandez-Moctezuma, et al., "Towards Execution Guarantees for Stream Queries", In IEEE International Symposium on Parallel & Distributed Processing, Workshops and Phd Forum, Apr. 19, 2010, 10 Pages.

Huang, et al., "Toward High-Performance Distributed Stream Processing via Approximate Fault Tolerance", In Proceedings of the VLDB Endowment, vol. 10, Issue 3, Nov. 2016, pp. 73-84.

Liono, et al., "Optimal Time Window for Temporal Segmentation of Sensor Streams in Multi-activity Recognition", In Proceedings of the 13th International Conference on Mobile and Ubiquitous Systems: Computing, Networking and Services, Nov. 28, 2016, pp. 10-19.

"International Search Report and the Written Opinion Issued in PCT Application No. PCT/US2020/029662", dated Jul. 29, 2020, 9 Pages.

\* cited by examiner

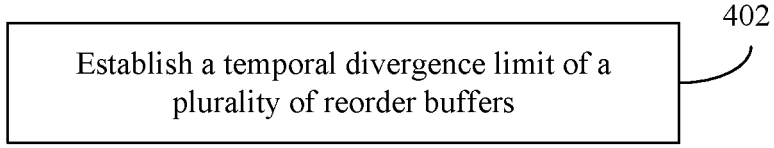
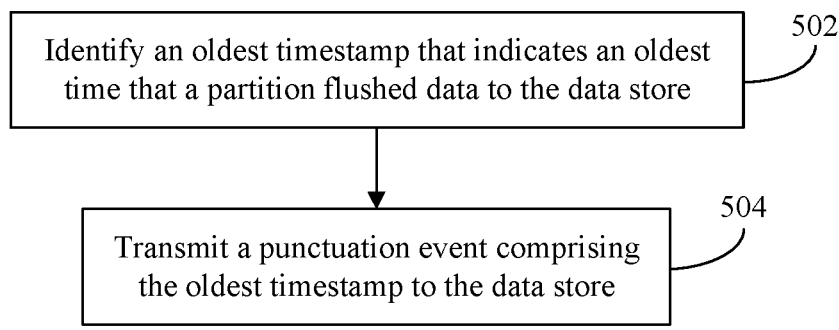
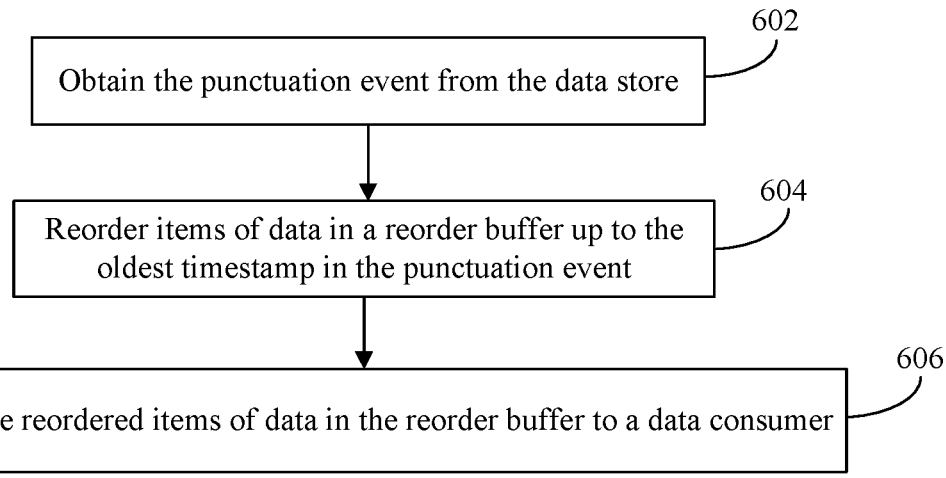

EFFICIENT OUT OF PROCESS RESHUFFLE OF STREAMING DATA

BACKGROUND

In some data analytics solutions, a stream of data, as opposed to a set of data stored in a repository, may be processed and consumed by a user in real-time or near real-time. For example, a stream of data may include data points from various data producing entities (e.g., sensors) where each data point has a temporal importance that may diminish over time, such as temperature and/or pressure sensors in a manufacturing facility. In situations where a high number of data producing entities exist or where a single machine is not suitable for processing the entire stream of data, several partitions are often employed to ingest data points from the data producing entities. However, in many instances, the data partitions (e.g., upstream partitions) that ingest data points from the data producing entities may not comprise an optimal partitioning for a data consumer. For instance, a data consumer may desire to visualize the data using a different partition key or dimension.

In order to accomplish such a different partitioning of data, techniques are often utilized to reshuffle the stream of data from a dimension of the upstream partitions to different set of partitions with another dimension, referred to as downstream partitions. Due to the temporal importance of the data points, the downstream partitions need to ensure that the stream of data is ordered appropriately (e.g., ordering an older event before a newer event, irrespective of which event arrived at the downstream partition first). However, because upstream partitions may operate at different speeds (or a partition may be down), a large reorder buffer is generally needed to temporarily hold data points to ensure that the stream of data is ingested by the consumer in the correct temporal order. As a result, existing solutions typically require large in-memory resources, which can present not only stability and recovery challenges, but also introduce a high latency between the occurrence of an event and that event being provided to a data consumer following a reshuffle.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer program products are provided for processing a stream of data. A maximum temporal divergence is established for data flushed to a data store from a plurality of upstream partitions. Each of a plurality of data flushers, each corresponding to an upstream partition, may obtain an item of data from a data producer. Each data flusher may determine whether flushing the data to the data store would exceed the maximum temporal divergence. Based at least on determining that flushing the data to the data store would not exceed the maximum temporal divergence, the data may be flushed to the data store for ingestion by a downstream partition and a data structure (e.g., a ledger) may be updated to indicate a time associated with the most recent item of data flushed to the data store.

Further features and advantages of the invention, as well as the structure and operation of various embodiments, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

FIG. 4 shows a flowchart of a method for limiting a reorder buffer, according to an example embodiment.

FIG. 5 shows a flowchart of a method for transmitting a punctuation event to a data store, according to an example embodiment.

FIG. 6 shows a flowchart of a method for reordering items in a reorder buffer up to a timestamp identified in a punctuation event, according to an example embodiment.

Figure 1:
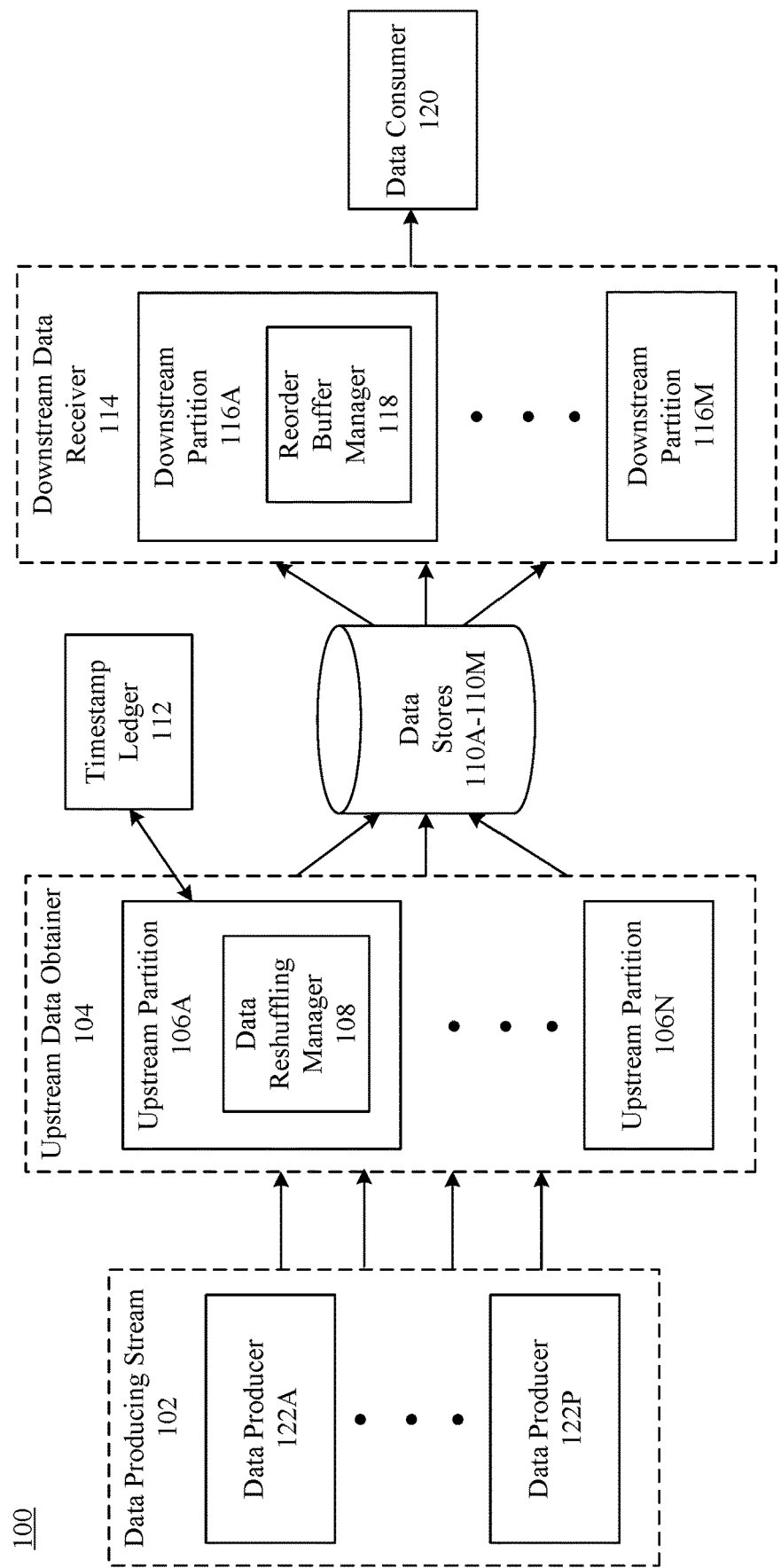
FIG. 1 shows a block diagram of a system for reshuffling a stream of data, according to an example embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an example embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Implementations

In some data analytics solutions, a stream of data, as opposed to a set of data stored in a repository, may be processed and consumed by a user in real-time or near real-time. For example, a stream of data may include data points from various data producing entities (e.g., sensors) where each data point has a temporal importance that may diminish over time, such as temperature and/or pressure sensors in a manufacturing facility. In situations where a high number of data producing entities exist or where a single machine is not suitable for processing the entire stream of data, several partitions are often employed to ingest data points from the data producing entities. However, in many instances, the data partitions (e.g., upstream partitions) that ingest data points from the data producing entities may not comprise an optimal partitioning for a data consumer. For instance, a data consumer may desire to visualize the data using a different partition key or dimension.

In order to accomplish such a different partitioning of data, techniques are often utilized to reshuffle the stream of data from a dimension of the upstream partitions to different set of partitions with another dimension, referred to as downstream partitions. Due to the temporal importance of the data points, the downstream partitions need to ensure that the stream of data is ordered appropriately (e.g., ordering an older event before a newer event, irrespective of which event arrived at the downstream partition first). However, because upstream partitions may operate at different speeds (or a partition may be down), a large reorder buffer is generally needed to temporarily hold data points to ensure that the stream of data is ingested by the consumer in the correct temporal order. As a result, existing solutions typically require large in-memory resources, which can present not only stability and recovery challenges, but also introduce a high latency between the occurrence of an event and that event being provided to a data consumer following a reshuffle.

For instance, some existing solutions utilize a monolithic approach when performing a large-scale reshuffle of a stream of data, which may require a large amount of intermediate data storage. An example of such an approach is known as a "merge then split" approach, in which a single merging entity may be responsible for merging the stream of data from all of the upstream partitions and then splitting the data to the appropriate downstream partitions. Since a single entity may be responsible for reshuffling the data in some solutions, the monolithic entity becomes a single point of failure for the entire pipeline encompassing the stream of data, and it becomes even more difficult to maintain and manage the pipeline.

In some other instances, such as a "split then merge" technique, each upstream partition may comprise a splitting entity that splits the stream of data into the number of downstream partitions, where each downstream partition may have a separate merging entity responsible for merging (and ordering) the data received from the upstream partition. However, in these types of solutions, a large number of network connections typically needs to be employed (e.g., a number of connections that is the product of the upstream partition count and the downstream partition count), which may not be optimal in many situations.

Furthermore, in the above approaches, even a trivial reshuffle of the data from upstream partitions into a different set of downstream partitions could potentially result in an infinitely large unordered sequence (e.g., due to upstream partitions operating at different speeds or being down) which would require an indefinitely large buffer introduced at some point in the pipeline to properly order items of data that may arrive out of order.

Embodiments described herein address these and other issues by providing a system for processing a stream of data. In an example system, a divergence limiter may establish a maximum temporal divergence of a stream of data that may be flushed to a data store from a plurality of upstream partitions. The maximum temporal divergence may be, for instance, the maximum time difference between an item of data flushed from the slowest upstream partition and the fastest upstream partition. A plurality of data flushers (each of which may correspond to an upstream partition) may obtain an item of data from one or more data producers and determine whether flushing the data to the data store would exceed the maximum temporal divergence. If it is determined that flushing the data to the data store would not exceed the maximum temporal divergence, the data may be flushed to the data store for ingestion by a downstream partition, and a data structure may be updated that indicates a time associated with the flushed item of data (e.g., a timestamp).

In this manner, flushing data from the upstream partitions to the data store may be performed based on whether the temporal divergence is exceeded, and therefore need not be ordered. Rather, ordering may be performed in a downstream reorder buffer of each of the downstream partitions. Since data flushed to the data store does not diverge in time by more than the established limit (e.g., 10 minutes), the downstream reorder buffers similarly may be temporally limited, thereby reducing the operational memory of the overall system. Such advantages, therefore may enable the improvement in the utilization of the machines that process and/or reshuffle a stream of data. By flushing items of data that are not necessarily ordered to a persistent storage, reordering to preserve the correct temporal order can be performed at a later point in the pipeline in a size-limited reorder buffer, thereby avoiding the need to keep all of the data currently in a pipeline in a volatile memory and therefore preserving the overall in-memory resources (and the cost associated with such resources). Furthermore, resources of the computing system (or systems) implementing the disclosed system may be available for other applications or processes, thereby reducing the cost of resources needed to perform a data reshuffle and improving the efficiency of the computing system in general.

In addition, implementations described herein provide for the transmission of a punctuation event that contains a timestamp up to which all upstream partitions have at least progressed, thereby allowing the downstream reorder buffers to flush data out of the buffers in a quicker manner and reducing the overall latency of data travelling through the pipeline. Still further, since each partition is coupled to the data store (or plurality of data stores), and each data store is coupled to the appropriate downstream partition, the overall number of connections between nodes may be reduced compared to existing solutions. Such a reduction in connections may not only improve performance of the network on which the reshuffling may be carried out (e.g., by reducing utilized connections and freeing up such resources for other network entities), the reduction in connections may also improve overall stability by reducing the number of possible connection failures. Furthermore, since each upstream partition, data store, and downstream partition may process data independent of each other, the overall number of failure points in the pipeline is also reduced, thereby further improving stability of the system. Still further, since no single entity may hold all of the data at a given time (e.g., since processing of the stream of data may be performed in a distributed manner on multiple machines), the recovery time due to a failure and/or the overall risk of data loss may also be reduced.

Example embodiments are described as follows for systems and methods for processing a stream of data. For instance, FIG. 1 shows a block diagram of a system 100, according to an example embodiment. As shown in FIG. 1, system 100 includes a data processing stream 102, an upstream data obtainer 104, data stores 110A-110M, a timestamp ledger 112, a downstream data receiver 114, and a data consumer 120. System 100 may comprise any number of data producing streams, upstream data obtainers, data stores, timestamp ledgers, downstream data receivers, and/or data consumers, including the numbers illustrated in FIG. 1 and optionally one or more further entities not expressly illustrated. As shown in FIG. 1, data producing stream 102 includes data producers 122A-122P. Upstream data obtainer 104 includes upstream partitions 106A-106N, each of which may comprise a data reshuffling manager 108. Downstream data receiver 114 includes downstream partitions 116A-116M, each of which may comprise a reorder buffer manager 118. As described in greater detail below, data reshuffling manager 108 of upstream partitions 106A-106N may be configured to obtain items of data from one or more data producers 122A-122P and flush the items of data to one or more data stores 110A-110M. Reorder buffer manager 118 of downstream partitions 116A-116M may ingest the items of data from a corresponding data store, reorder the ingested items of data, and flush the reordered items of data to data consumer 120. System 100 is further described as follows.

One or more of data producing stream 102, upstream data obtainer 104, data stores 110A-110M, timestamp ledger 112, downstream data receiver 114, and/or data consumer 120 (including any subcomponents thereof) may be communicatively coupled to each other via one or more networks, including one or more of any of a local area network (LAN), a wide area network (WAN), a personal area network (PAN), a combination of communication networks, such as the Internet, and/or a virtual network. In an implementation, any one or more of data producing stream 102, upstream data obtainer 104, data stores 110A-110M, timestamp ledger 112, downstream data receiver 114, and/or data consumer 120 (including any subcomponents thereof) may communicate via one or more application programming interfaces (API) and/or according to other interfaces and/or techniques. Data producing stream 102, upstream data obtainer 104, data stores 110A-110M, timestamp ledger 112, downstream data receiver 114, and/or data consumer 120 may each include at least one network interface that enables communications with each other. Examples of such a network interface, wired or wireless, include an IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, a near field communication (NFC) interface, etc. Further examples of network interfaces are described elsewhere herein.

Data producing stream 102 may comprise a collection of any one or more data producers 122A-122P that may provide data points to upstream data partitions 106A-106N of upstream data obtainer 104. Data producers 122A-122P may include, for instance, entities that may monitor one or more environments, including but not limited to sensors (e.g., temperature sensors, pressure sensors, velocity sensors, accelerometers, doppler sensors, radar sensors, altitude sensors, light sensors, location sensors, etc.), network monitoring components (e.g., network traffic monitors, antivirus and/or anti-malware detectors, etc.), or any other data producing entity that may generate an stream (e.g., an ongoing flow) of data. In examples, such data producing entities may be implemented in environments including but not limited to factories, offices, mobile phones, vehicles (e.g., autonomous vehicles), aircraft, network environments. Accordingly, data producers 122A-122P may comprise any physical or virtual machine, computing device, network node or agent, hardware and/or software, etc. An example computing device that may implement features of one or more of data producers 122A-122P is described below with reference to FIG. 7. In implementations, data producing stream 102 may include any number of data producers 122A-122P, including in the tens, hundreds, thousands, millions, or more.

In implementations, data points generated by data producers 122A-122P may also comprise an associated timestamp, such as a timestamp that identifies the time when the data point was generated, enqueued, processed, and/or transmitted by the respective data producer, or any other time based on a system time of the data producer. Each data point may comprise a temporal importance such that data points generated in the present may be more important than data points generated in the past (e.g., the importance of data points may diminish over time). As a result, real-time (or near real-time) processing of data points generated by data producers 122A-122P, with relatively little latency, may generally be desired in implementations.

In examples, data points generated by data producers 122A-122P may be provided to one or more of upstream partitions 106A-106N. For instance, data producers 122A-122P may be configured with and/or assigned a partition identifier (ID) that may identify each of the one or more of upstream partitions 106A-106N to which the data points of each respective data producer are transmitted (e.g., the partition ID may comprise a number between 0 and N−1, where N is the number of upstream partitions in the pipeline shown in the system of FIG. 1). Examples are not limited to assigning a partition ID, and may include any other manner of routing data points between data producers 122A-122P, and upstream partitions 106A-106N. In implementations, therefore, data points each of data producers 122A-122P may be partitioned by any suitable dimension (e.g., by sensor type, type monitored activity, location, etc.) of upstream partitions 106A-106N.

Upstream partitions 106A-106N may comprise any one or more computing platforms, including but not limited to computing devices, servers, clusters, processing nodes, machines (e.g., virtual machines, physical machines, etc.), services (e.g., web services), or other computing platforms for obtaining and/or processing items of data obtained from data producing entities, such as data producers 122A-122P. In examples, upstream partitions 106A-106N may comprise one or more distributed computing platforms in which each partition may be configured to obtain and/or process a subset of data of data producing stream 102 (e.g., obtaining and/or processing data of data producing stream 102 with the corresponding partition ID). For instance, upstream partitions 106A-106N may comprise a collection or network of computing platforms that may process data of data producing stream 102 separately and/or independent from each other. In some examples, one or more of upstream partitions 106A-106N may be co-located with each other, or may be located remotely (e.g., in different physical locations, on different networks, etc.). Accordingly, in some implementations, upstream partitions 106A-106N may be implemented on different computing platforms. Upstream data obtainer 104 may comprise the entire set of upstream partitions 106A-106N.

In implementations, data reshuffling manager 108 may be configured to flush items of data obtained from data producing stream 102 by each upstream partition (e.g., based on a partition ID) to one or more data stores 110A-110M. In examples, data reshuffling manager 108 may flush items of data according to a maximum temporal divergence. For instance, timestamp ledger 112 may comprise a listing (e.g., in a data structure such as a table) that indicates the last time each partition of upstream partitions 106A-106N flushed an item of data to data stores 110A-110M. Where data reshuffling manager 108 determines that flushing data to data stores 110A-110M would not exceed the maximum temporal divergence, the data may be flushed to the data store.

As will be described in greater detail below, items of data flushed to data stores 110A-110M need not be ordered (e.g., in temporal order), but rather may be flushed out of order. For instance, if one partition is operating faster than another partition, the faster partition may still flush an item of data to data stores 110A-110M even if the item of data has an associated timestamp that is later than an item of data currently being processed through the slower partition. In implementations, appropriate reordering may be performed by reorder buffer manager 118, as described later.

Data stores 110A-110M may comprise any type of storage, including but not limited to a persistent storage (e.g., a hard disk drive, a flash drive, a magnetic drive, an optical storage, a centralized storage, a distributed storage, a network or cloud-based storage, etc.). In some implementations, data stores 110A-110M may comprise a persistent data cube (e.g., a multi-dimensional array of data) that may ingest and/or store items of data from a plurality of stream of data (e.g., from each upstream partition) for accessing by a plurality of downstream partitions. In some implementations, the persistent storage (e.g., data cube) may be partitioned according to the number of downstream partitions (e.g., M partitions). In another example, data stores 110A-110M may comprise a data log, such as an append-only log, that may comprise a plurality of partitions (e.g., M partitions) with each partition corresponding to a particular one of the downstream partitions shown in FIG. 1. It is noted and understood that implementations are not limited to the illustrative examples, and may include any other type of persistent storage for storing items of data that is accessible by a plurality of downstream partitions. Furthermore, although it is illustrated that a plurality of data stores 110A-110M may be present in some examples, it is understood that techniques described herein may also be implemented with a singular data store that comprises a plurality of partitions (e.g., M partitions).

Downstream partitions 116A-116M may comprise one or more comprise any one or more computing platforms, including but not limited to computing devices, servers, clusters, processing nodes, machines (e.g., virtual machines, physical machines, etc.), services (e.g., web services), or other computing platforms for obtaining and/or processing items of data obtained from data stores 110A-110M, as described in greater detail below. In examples, downstream partitions 116A-116M may be configured to partition items of data generated by data producers 122A-122P in one or more dimension that are different than the dimensions of upstream partitions 106A-106N. Downstream data receiver 114 may comprise the entire set of downstream partitions 116A-116M.

As an illustration, upstream partitions 106A-106N may partition data of data producing stream 102 according to a store location (e.g., five partitions, each corresponding to a different store), while downstream partitions 116A-116M may partition the data according to a product type (e.g., four partitions, each corresponding to product types sold across the stores). Accordingly, while the underlying data obtained from data producing stream 102 may be the same or similar, the dimensions by which the data is partitioned may be different or the data may be reorganized in any other manner where data is partitioned by some key or dimension in N-number of upstream partitions to another key or dimension of M-number of downstream partitions, where N and M may be the same or different number. In some examples, each downstream partition may also comprise a reorder buffer that includes a temporary memory (e.g., random-access memory (RAM) or the like) for temporarily holding data points while items of data obtained from data stores 110A-110M may be properly reordered (e.g., according to a timestamp associated with each item of data). In other words, data stores 110A-110M may comprise items of data associated with each downstream partition that are not necessarily ordered, and therefore reordering of such data may be managed by reorder buffer manager 118.

Upon reordering items of data, each of downstream partitions 116A-116M may flush data to another storage device or resource (e.g., a local storage or memory, a cloud-based storage, any other persistent storage, a web service, etc.). For instance, reordered data may be flushed (e.g., persisted) to a storage device that may be accessible by data consumer 120. In examples, data consumer 120 may include a computing device of one or more users (e.g., individual users, family users, enterprise users, governmental users, etc.) that may comprise one or more applications, operating systems, virtual machines, storage devices, etc. that may be executed, hosted, and/or stored therein or via one or more other computing devices over a network. In some examples, data consumer 120 may access data reordered by downstream data receiver 114, as described herein. Data consumer 120 may be any type of stationary or mobile computing device, including a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone, a wearable computing device, or other type of mobile device, or a stationary computing device such as a desktop computer or PC (personal computer), or a server. Data consumer 120 is not limited to a physical machine, but may include other types of machines or nodes, such as a virtual machine. Data consumer 120 may interface with downstream data receiver 114 through APIs and/or by other mechanisms (e.g. via one or more network connections). Note that any number of program interfaces may be present.

In implementations, data consumer 120 may comprise any computing device for collecting, aggregating, analyzing, and/or visualizing items of data from data producing stream 102 in real-time or near real-time, including but not limited to computing devices and/or services operated by users, autonomous and/or semi-autonomous devices (e.g., vehicles, network alert services, robotic devices, manufacturing components, etc.), data analytics packages, anti-virus or anti-malware solutions, etc. Examples are not limited, and may include any other data consuming device configured to process data from data producing stream 102 (e.g., comprising a plurality of individual data producers 122A-122P) in real-time or near real-time.

It is noted and understood that implementations are not limited to the illustrative arrangement shown in FIG. 1. Rather, system 100 may comprise any number of computing devices and/or servers that may implement features described herein in any manner. Furthermore, although any one or more of the components or subcomponents illustrated in FIG. 1 may be co-located, located remote from each other, may be implemented on a single computing device or virtual machine, or may be implemented on or distributed across one or more additional computing devices or virtual machines not expressly illustrated in FIG. 1.

Note that the variables "M," "N," and "P" are appended to various reference numerals for illustrated components to indicate that the number of such components is variable, with any value of 2 and greater. The values of "M," "N," and "P" for any particular component/reference numeral may be less than 10, in the 10s, in the hundreds, in the thousands, or even greater, depending on the particular implementation.

Figure 2:
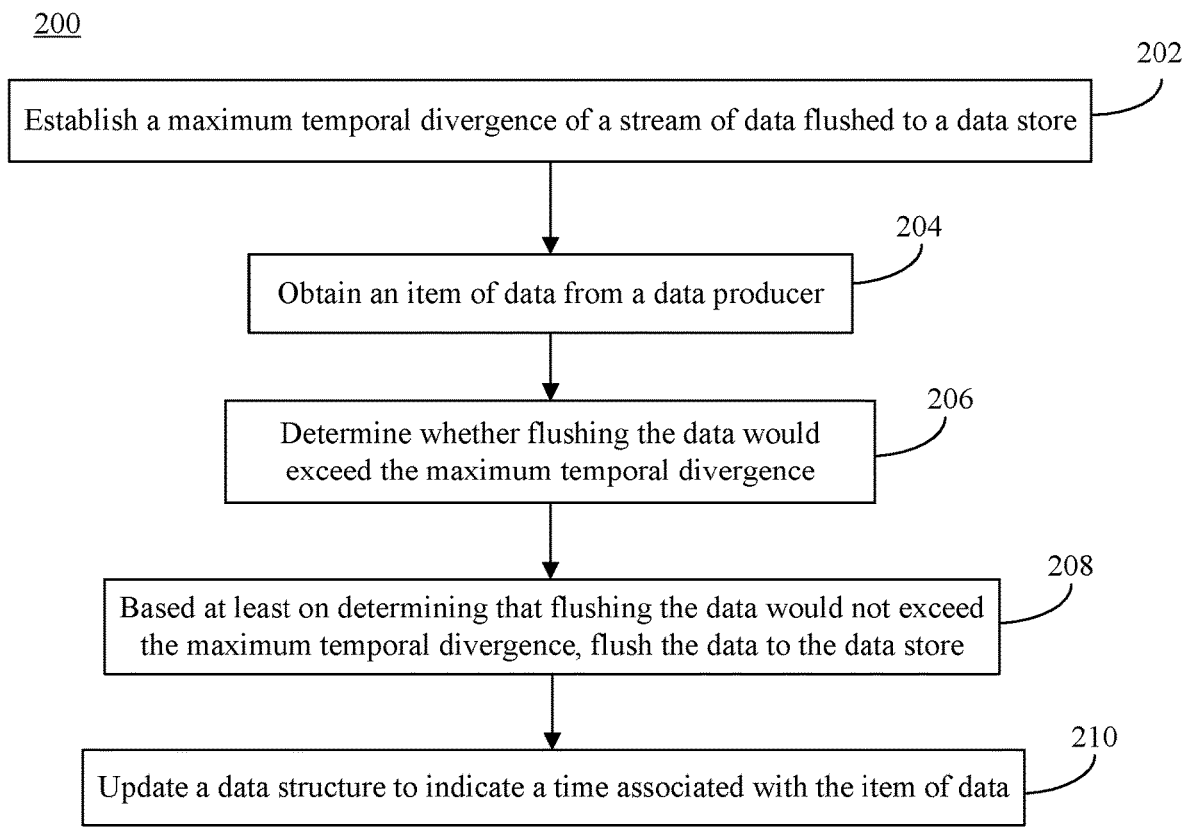
FIG. 2 shows a flowchart of a method for processing a stream of data, according to an example embodiment.

As described, data reshuffling manager 108, data stores 110A-110M, timestamp ledger 112, and/or reorder buffer manager 118 may enable the real-time (or near real-time) reshuffling of data in various ways. For instance, data reshuffling manager 108, data stores 110A-110M, timestamp ledger 112, and/or reorder buffer manager 118 of system 100 may operate according to FIG. 2. FIG. 2 shows a flowchart 200 of a method for processing a stream of data, according to an example embodiment. For illustrative purposes, flowchart 200 and system 100 are described as follows with respect to FIG. 3.

Figure 3:
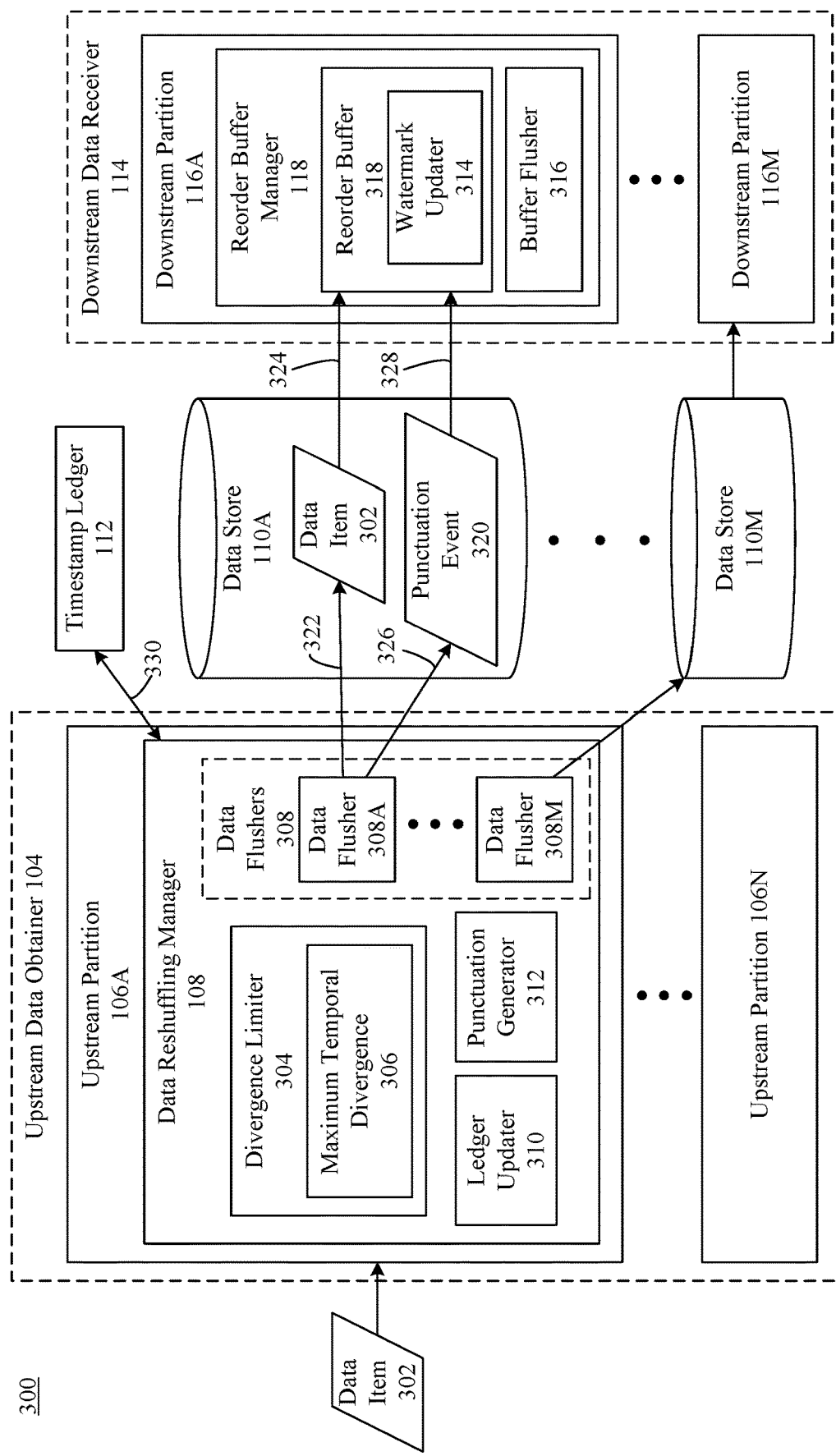
FIG. 3 shows a block diagram of a system for reshuffling a stream of data, according to an example embodiment.

FIG. 3 shows a block diagram of a system 300 for reshuffling a stream of data, according to an example embodiment. As shown in FIG. 3, system 300 includes an example implementation of upstream data obtainer 104, data stores 110A-110M, timestamp ledger 112, and downstream data receiver 114. Upstream data obtainer includes upstream data partitions 106A-106N. Each of upstream partitions 106A-106N includes data reshuffling manager 108. Data reshuffling manager 108 includes a divergence limiter 304, data flushers 308, ledger updater 310, and punctuation generator 312. Divergence limiter 304 includes a maximum temporal divergence 306. Data flushers 308, as shown in FIG. 3, includes data flushers 308A-308M. Data reshuffling manager 108 may receive a data item 302 (e.g., an item of data from one of data producers 122A-122P). In the example shown in FIG. 3, data store 110A may be configured to obtain data item 302 and a punctuation event 320. Downstream data receiver 114 includes downstream partitions 116A-116M. Each of downstream data partitions 116A-116M includes reorder buffer manager 118, which may comprise a reorder buffer 318 that includes a watermark updater 314, and a buffer flusher 316. Flowchart 200 and system 300 are described in further detail as follows.

Flowchart 200 of FIG. 2 begins with step 202. In step 202, a maximum temporal divergence of a stream of data flushed to a data store is established. For instance, with reference to FIG. 3, divergence limiter 304 may be configured to establish maximum temporal divergence 306 of a stream of data (e.g., a stream of items of data obtained from data producing stream 102) flushed to data stores 110A-110M. In examples, data flushers 308A-308M may be configured to flush 322 the stream of data, based on maximum temporal divergence 306, to an appropriate one of data stores 110A-110M.

Maximum temporal divergence 306 may comprise any temporal limit relating to a largest permissible temporal divergence of data that may be stored in any of data stores 110A-110M, or how far ahead (temporally) the fastest upstream partition may be relative to the slowest upstream partition. For instance, maximum temporal divergence 306 may represent an upper limit on time that any two upstream partitions may be apart in flushing items of data to data stores 110A-110M. For example, maximum temporal divergence 306 may comprise a limit of ten minutes (though this limit is only illustrative, and may comprise any other time in seconds, minutes, hours, days, etc.). In such an example, any of data flushers 308A-308M may flush an item of data from data producing stream 102 where a timestamp associated with the item of data is not more than ten minutes ahead of the most recent data item flush by any other data flusher of data flushers 308. As a result, maximum temporal divergence 306 may limit the amount of data that may be flushed to data stores 110A-110M such that a delta between the slowest one of data flushers 308 and the fastest one of data flushers 308 does not exceed the maximum temporal divergence.

In implementations, divergence limiter 304 may be configurable to establish maximum temporal divergence 306 in various ways, including via a suitable user interface, preprogramming of divergence limiter 304 (e.g., via a configuration file or the like), or automatically (e.g., based on the volume and/or frequency of data producing stream 102).

In step 204, an item of data is obtained from a data producer. For instance, with reference to FIG. 3, a data flusher of data flushers 308 may obtain an item of data from data producing stream 102. As shown in the illustrative example of FIG. 3, data flusher 308A of upstream partition 106A may obtain data item 302. Data item 302 may comprise any item of data (e.g., data point) generated by one of data producers 122A-122P. Data item 302 may include, for example, sensor information, network information, location information, etc., examples of which are described herein, along with an associated timestamp that may indicate when data item 302 was generated. In examples, the timestamp may identify the year, day, month, hour, minute, second, and/or millisecond, etc. associated with the generation of data item 302. As described previously, data item 302 may be routed or otherwise provided to a particular one of the upstream partitions (e.g., upstream partition 106A in the example shown in FIG. 3) based on an identifier, such as an assigned partition ID.

Data flusher 308A may obtain data item 302 for flushing to an appropriate data store (data store 110A in this illustration). In implementations, data flushers 308A-308M may each correspond to a different one of downstream partitions 116A-116M. For instance, data flusher 308A may flush items of data directed to downstream partition 116A to data store 110A from which downstream partition 116A may obtain items of data, data flusher 308A may flush items of data directed to downstream partition 116B to data store 110B from which downstream partition 116B may obtain items of data, and so on. In other words, an initial reshuffling of the items of data obtained from data producing stream 102 may be performed on each of the upstream partitions, such as by repartitioning the data from a first dimension according to the upstream partitions to a second dimension according to the downstream partitions.

Data flushers 308A-308M are illustrated in FIG. 3 as separate entities for illustrative purposes only. In implementations, each upstream partition may comprise a single data flusher that may flush data to data stores 110A-110M or to a single data store (e.g., where a single data store may comprise a plurality of partitions, each of which correspond to a downstream partition), or a plurality of data flushers 308A-308M, each of which flush data to a data store for ingestion by the appropriate downstream partition.

It is also noted and understood that data item 302 may represent a single instance of an item of data (e.g., a particular data point) obtained from data producing stream 102 for illustrative purposes. In implementations, data producing stream 102 may provide a continuous or ongoing stream of items of data to upstream partitions 106A-106N via a network or any other communicative coupling. While the flowchart 200 is described with reference to a single example item of data, it is understood that the techniques described may similarly apply to any other item of data obtained from data producing stream, irrespective of the upstream partition the item of data initially receives the data and the downstream partition that may receive the data upon a reshuffling operation.

In step 206, it is determined whether flushing the data to the data store would exceed the maximum temporal divergence. For instance, with reference to FIG. 3, each of data flushers 308A-308M may be configured to determine whether flushing data item 302 to the appropriate one of data stores 110A-110M (e.g., depending on which downstream partition should receive data item 302 according to the reshuffling process) would exceed maximum temporal divergence 306.

In examples, data flushers 308A-308M may determine whether flushing data to the appropriate data store would violate maximum temporal divergence 306 by accessing and/or obtaining 330 timestamp ledger 112. Timestamp ledger 112 may comprise a data structure, such as a table, spreadsheet, database, log file, etc. that may indicate the most recent time (e.g., based on a timestamp) that a data flusher of each upstream partition 106A-106N flushed an item of data to any of data stores 110A-110M. In implementations, timestamp ledger 112 may be stored in a centralized manner such that data flushers 308 of each upstream partition 106A-106N may access timestamp ledger 112. In examples, timestamp ledger 112 may be stored in-memory and/or in a persistent storage in a centralized manner (e.g., on a server or the like) that may be shared to each upstream partition. Each data flusher 308 of each upstream partition 106A-106N may obtain timestamp ledger 112 in a periodic (e.g., every second, minute, etc.) or ongoing manner, and store an in-memory version of the ledger, store the ledger in a cache, and/or store the table in a persistent storage that may be local to the partition. In this manner, each data flusher of each upstream partition may be enabled to access an up-to-date date version of timestamp ledger 112 in order to determine whether flushing data to a data store would violate maximum temporal divergence 306. Although a single instance of timestamp ledger 112 is depicted in FIG. 3, it is noted that timestamp ledger 112 may also be distributed across a plurality of machines, partitions, servers, etc. for redundancy.

As described, timestamp ledger 112 may comprise, for each of upstream partitions 106A-106N, an indication that identifies the most recent time that the partition flushed data to any of data stores 110A-110M. In an example provided for illustrative purposes only, timestamp ledger 112 may indicate, for each of five upstream partitions, the following mapping between partitions and timestamps:

Partition 00: 01:00
Partition 01: 01:01
Partition 02: 01:01
Partition 03: 01:01
Partition 04: 01:01

In such an example, each of timestamps (expressed in HH:MM format, but may include any other time format, including years, days, months, seconds, milliseconds, etc.) may indicate the most recent time that a data flusher of the partition flushed data to any one of the data stores (e.g., the last output time for each upstream partition). For instance, as shown above, the most recent timestamp of an item of data flushed by Partition 00 was 01:00, the most recent timestamp of an item of data flushed by Partition 01 was 01:01, and so on. Each time a new item of data is flushed to any of data stores 110A-110M by an upstream partition, timestamp ledger 112 may be updated with the new timestamp for the partition.

Using the above example, data flusher 308A (of Partition 00 in this illustration) may use timestamp ledger 112 to determine whether flushing data item 302 to data store 110A would violate maximum temporal divergence 306. For instance, if maximum temporal divergence 306 was configured as ten minutes, data flusher 308A may compare the timestamp associated with data item 302 to determine whether the timestamp of the data item is more than ten minutes ahead of any of the timestamps indicated in timestamp ledger 112. If, for instance, data item 302 comprised a timestamp of 01:09, data flusher 308A may determine that flushing data item 302 to data store 110A would not violate the maximum temporal divergence 306 because the timestamp of the item of data to be flushed is within the configured limit of ten minutes. If, on the other hand, data item 302 comprised a timestamp of 01:12, data flusher 308A would determine that flushing the data item to the data store would exceed (e.g., violate) maximum temporal divergence 306, and therefore would not yet flush the data item in this instance. In this way, data flushers 308A-308M may ensure that no partition among upstream partitions 106A-106N is significantly ahead of another partition (e.g., one that is down or recovering from a failure), thus limiting the amount of data that may be ingested by each downstream reorder buffer.

In step 208, based at least on determining that flushing the data to the data store would not exceed the maximum temporal divergence, the item of data is flushed to the data store. For instance, with reference to FIG. 3, data flushers 308A-308N may be configured to flush an item of data (e.g., data item 302) to the appropriate one of data stores 110A-110M based at least on determining that flushing the item of data would not exceed maximum temporal divergence 306. For example, in the illustrative arrangement shown in FIG. 3, data flusher 308A may flush data item 302 to data store 110A, for ingestion by downstream partition 116A.

As described earlier, data store 110A (or any of the other data stores) may comprise a persistent storage, such as a persistent data cube, for storing each item of data received by upstream partitions 106A-106N and flushed to the data store. In examples, data flushers 308 may flush items of data to the appropriate data store by transmitting the item of data over a suitable communication link, such as a network connection.

In implementations, each of upstream partitions 106A-106N may operate independently, such as in a distributed or parallel manner, when flushing items of data to the appropriate one of data stores 110A-110M. While each upstream partition may process items of data from data producing stream 102 in a temporal order (i.e., data points received over the stream may be flushed sequentially), items of data flushed to data stores 110A-110M need not be flushed in temporal order across all of the upstream partitions. For instance, upstream partition 106A may flush an item of data comprising a timestamp of 01:09 after upstream partition 106B flushes an item of data comprising an earlier timestamp of 01:05. As a result, items of data stored across data stores 110A-110M (received from any of upstream partitions 106A-106N) may be flushed in a non-sequential manner that is not necessarily ordered. In this manner, since ordering need not be performed by any of upstream partitions 106A-106N or data stores 110A-110M, items of data may be flushed to the appropriate data store quicker and resources (e.g., memory buffers or caches used to temporarily hold data events) may be preserved at the upstream partitions.

In instances where a data flusher determines that flushing an item of data to an appropriate one of data stores 110A-110M would exceed maximum temporal divergence 306, the data flusher may not flush the item of data to the data store. Such instances may occur, for example, where one or more upstream partitions are down (e.g., due to a software and/or hardware failure) or significantly behind other partitions. In such instances, the data flusher may identify the item as being in a "pending" state and/or hold the item of data in a queue (e.g., a buffer or the like) such that items of data may not processed through the pipeline while a partition is down or significantly behind. The data flusher may retry flushing the item of data at a later time by polling timestamp ledger 112 in a continuous or periodic manner until flushing the item of data would not exceed maximum temporal divergence 306, at which point the item of data may be flushed (and timestamp ledger 112 may be updated). By flushing data to data stores 110A-110M based on maximum temporal divergence 306, the size of the data stores may thereby be limited such that data points flushed across the data stores do not exceed the temporal limit. As will be described later, such a limit may also enable a reorder buffer in each of the downstream partitions to comprise a reduced size, thus conserving in-memory resources at various stages in the pipeline.

In step 210, a data structure is updated to indicate a time associated with the item of data. For instance, based at least on a data flusher determining that flushing data to an appropriate data store would not violate maximum temporal divergence 306, ledger updater 310 may be configured to update timestamp ledger 112 with the timestamp of the item of data last flushed to one of data stores 110A-110M. For instance, continuing with the illustrative example of FIG. 3, ledger updater 310 may update 330 timestamp ledger 112 to indicate with the timestamp of data item 302 that partition 106A recently flushed to data store 110A (e.g., by updating a timestamp value from 01:00 to 01:09).

Ledger updater 310 may be implemented in various ways. For instance, although ledger updater 310 is illustrated in FIG. 3 as being implemented in each of upstream partitions 106A-106N, other arrangements are also contemplated, such as implementing ledger updater 310 in a single upstream partition. In other example embodiments, ledger updater 310 may be implemented outside of partitions 106A-106N, such as in a server or servers that may store timestamp ledger 112 and/or one or more of data stores 110A-110M. For instance, timestamp ledger 112 may be configured to detect when any of data stores 110A-110M receives a new item of data from any of upstream partitions 106A-106N, and automatically update timestamp ledger 112 to reflect an updated timestamp for the transmitting partition. These examples are not intended to be limiting, and implementations may include any other suitable manner appreciated by those skilled in the relevant arts to update timestamp ledger 112. Upon an updated timestamp being stored in timestamp ledger 112 for a particular partition, each of the upstream partitions may be notified of the updated value (e.g., by providing timestamp ledger 112 as whole, or providing the updated value).

As described above, divergence limiter 304 may limit the size of a downstream reorder buffer. For example, FIG. 4 shows a flowchart 400 of a method for limiting a downstream reorder buffer, according to an example embodiment. In an implementation, the method of flowchart 400 may be implemented by divergence limiter 304 and/or reorder buffer 318. FIG. 4 is described with continued reference to FIG. 3. Other structural and operational implementations will be apparent to persons skilled in the relevant art(s) based on the following discussion regarding flowchart 400 and system 300 of FIG. 3.

Flowchart 400 begins with step 402. In step 402, a temporal divergence limit is established for a plurality of reorder buffers. For instance, with reference to FIG. 3, reorder buffer 318 may comprise a temporal divergence limit that limits the size of a buffer (e.g., temporary memory such as a cache or the like) for temporarily holding a plurality of items of data while such items are being reordered. In examples, reorder buffer 318 of a particular partition may be configured to ingest 324 data items directed (e.g., assigned to) to the partition from a corresponding data store upon the data item being flushed to the data store. For instance, reorder buffer 318 of downstream partition 116A may ingest items of data from data store 110A, a reorder buffer of downstream partition 116B may ingest items of data from data store 110B, and so on. Reorder buffer 318 may obtain the item of data in real-time or near real-time over a suitable communication coupling, such as a network link or the like. In some implementations, upon reorder buffer 318 obtaining an item of data from the corresponding data store, the item of data may be removed (e.g., deleted, flagged for deletion, etc.) from the data store.

As described earlier, since data stores 110A-110M may not contain items of data that diverge in time beyond maximum temporal divergence 306 (e.g., ten minutes), divergence limiter 304 may be configured to effectively establish a temporal divergence limit on the size of reorder buffer 318. For instance, divergence limiter 304 may be configured to establish maximum temporal divergence 306 to limit a temporal divergence of data that data flushers 308 may flush to any one of data stores 110A-110M. Since data flushers 308 may flush an item of data where the data's timestamp would not exceed maximum temporal divergence 306, data flushed across data stores 110A-110M may thereby comprise data items within maximum temporal divergence 306 (e.g., the data stores may only comprise data items within a ten-minute period). In this manner, a temporal divergence limit may be established for reorder buffer 318 that reduces the size of the buffer, which may thereby reduce the memory requirements of each of downstream partitions 114 and enhance stability. Stated differently, by coordinating the flushing of data items by upstream partitions 106A-106N to data stores 110A-110M based on a maximum temporal divergence, the size of the reorder buffers may thereby be reduced.

As described earlier, since items of data may be flushed to data stores 110A-110M in any order (e.g., not necessarily in a temporal order), reorder buffer 318 may thereby ingest items of data directed to a particular partition that is similarly unordered. In other words, while items of data from a particular upstream partition (e.g., upstream partition 106A) are processed and flushed to data stores in temporal order, different upstream partitions may be performing at different speeds, which may cause another partition (e.g., upstream partition 106B) to process and flush data items with earlier timestamps to data stores 110A-110M after upstream partition 106A flushes data items with subsequent timestamps. As a result, reorder buffer 318 may need to perform a reordering process on such items of data to render the items in the correct temporal order prior to flushing the items of data to a data consumer.

In example embodiments, reorder buffer 318 may implement a watermark technique for reordering items of data items of data up to the watermark may be reordered and flushed to a data consumer. The watermark for a particular reorder buffer may represent the oldest value among the most recent timestamps associated with items of data received across each of upstream partitions 106A-106N (which may be a timestamp associated with the slowest upstream partition in an example). For instance, if reorder buffer 318 was configured to receive data items from five upstream partitions, reorder buffer 318 may store, in a table or other data structure, the timestamp of the most recent item of data ingested from each of the upstream partitions. Based on the collection of timestamps (a total of five timestamps in this particular example), the oldest timestamp may represent the "watermark," which is the point up to which items of data may be considered reordered and flushed to a data consumer. In other words, since each upstream partition processes data items in order, reorder buffer 318 may infer that once an item of data is received from a particular partition, no data items may be subsequently received from that particular partition that predate the received data item. Accordingly, across all of the upstream partitions, items of data in reorder buffer 318 may be deemed reordered up to and including the watermark, and subsequently flushed to data consumer 120.

It is noted that although it is described herein that the downstream reorder buffers may flush data to a data consumer based on a temporal limit of the reorder buffer, it is contemplated that a less strict approach may be implemented in some other instances, such as by enabling one or more of the downstream reorder buffers to flush data to a data consumer based on any other factors even if the watermark is not caught up (e.g., conditions that may be defined for certain partitions and/or data producers, allowing a partition to progress even if an upstream partition is down or recovering, etc.). In some further implementations, one or more configurable controls may also be implemented to control the flow of data items through the pipeline, such as controls to block and/or unblock certain data producers or upstream partitions.

In some instances, such as where each of upstream partitions 106A-106N are healthy (e.g., processing data in a timely manner, with no partition being down), implementations may enable a further reduction in the latency of flushing data to a data consumer. For instance, since the watermark associated with a particular downstream partition described previously typically moves when that downstream partition receives data intended for it, there may be instances where upstream partitions are still healthy and transmitting items of data for ingestion by different downstream partitions. In such situations, the watermark for the particular downstream partition that is not receiving any items of data may not move in a timely manner, thus resulting in an end-to-end latency of data items flowing through that downstream partition.

Implementations described herein may enable the reduction of such a latency. For example, FIG. 5 shows a flowchart of a method for transmitting a punctuation event to a data store, according to an example embodiment. In an implementation, the method of flowchart 500 may be implemented by punctuation generator 312 and/or data flushers 308. FIG. 5 is described with continued reference to FIG. 3. Other structural and operational implementations will be apparent to persons skilled in the relevant art(s) based on the following discussion regarding flowchart 500 and system 300 of FIG. 3.

Flowchart 500 begins with step 502. In step 502, an oldest timestamp that indicates an oldest time that a partition flushed data to a data store is identified. For instance, with reference to FIG. 3, punctuation generator 312 may be configured to reference timestamp ledger 112 (stored in memory or in a cache, and/or stored remotely) to identify the oldest time that any of upstream partitions 106A-106N flushed data to any of data stores 110A-110M. In other words, punctuation generator 312 may identify the timestamp representing the slowest performing partition based on the partition's most recent flushing of data. As an illustrative example, timestamp ledger 112 may indicate, for each of five upstream partitions, a timestamp as follows:

Partition 00: 01:08
Partition 01: 01:10
Partition 02: 01:07
Partition 03: 01:01
Partition 04: 01:09

In such an example, punctuation generator 312 may identify timestamp 01:01 corresponding to Partition 03 as the oldest timestamp in timestamp ledger 112. In some example embodiments, punctuation generator 312 may identify the oldest timestamp at a predetermined interval (e.g., periodically every second, ten seconds, minute, etc.).

It is also noted and understood that punctuation generator 312 need not be implemented in each of upstream partitions 106A-106N as illustrated in FIG. 3. Rather, in some example embodiments, punctuation generator 312 may be implemented in a subset or a single one of the upstream partitions (e.g., upstream partition 106A, or a master partition). For instance, any one of the upstream partitions may comprise punctuation generator 312 configured to query timestamp ledger 112 to retrieve the oldest timestamp described herein. In some further implementations, such an upstream partition may be configured to retrieve the oldest timestamp for all upstream partitions except the current partition (since the partition is aware of its own watermark). In yet some other implementations, such as where a 1:1 relationship exists between the upstream partitions and the downstream partitions (e.g., in the case of a fully parallel job), each upstream partition may be configured to generate and transmit a punctuation event corresponding to its own timestamp, rather that querying timestamp ledger 112. Accordingly, implementations are not limited to any particular method or manner of generating and transmitting a punctuation event, and may include any suitable technique as will be appreciated by those skilled in the relevant arts.

In step 504, a punctuation event is transmitted to a data store comprising the oldest timestamp. For instance, with reference to FIG. 3, punctuation generator 312 may generate punctuation event 320 that comprises the oldest timestamp identified in timestamp ledger 112. In implementation, data flushers 308A-308M may transmit 326 (e.g., broadcast) the punctuation event to each of data stores 110A-110M for ingestion by the appropriate one of downstream partitions 116A-116M at the same predetermined interval described with respect to step 502. As will be explained in greater detail below, watermark updater 314 may be configured to move the watermark of reorder buffer 318 based on a punctuation event 320, thereby further reducing the latency in flushing reordered data items to a data consumer.

In examples, data flushers 308A-308M may transmit punctuation event 320 in the same or similar manner as transmitting data item 302 (or any other items of data received from data producing stream 102). In other words, data flushers 308A-308M may be configured to transmit punctuation event 320 over the same communication link or links as any other item of data flushed to data stores 110A-110M. Although the same or similar communication link may be utilized, it is noted that punctuation event 320 need not include an item of data from data producing stream 102. Rather, punctuation event 320 may comprise the appropriate value identified from timestamp ledger 112 (e.g., without any other data from data producing stream 102). The same or similar communication link(s) may be utilized to ensure that downstream partitions 116A-116M ingest the punctuation event in an appropriate temporal order. For example, if punctuation event 320 was transmitted directly to a downstream partition rather than through the appropriate data store, the downstream partition may receive the punctuation event indicating an oldest timestamp value that may postdate an item of data that is currently working its way through the pipeline (e.g., in one of data stores 110A-110M). In such a scenario, therefore, the downstream partition may not accurately reorder data items ingested from the appropriate data store. Since punctuation event 320 is transmitted over the same link as other items of data, it can be ensured that the punctuation event (containing a timestamp associated with a particular item of flushed data) is ingested chronologically after the particular item of flushed data is ingested by the appropriate downstream partition.

As described earlier, punctuation event 320 may enable a downstream reorder buffer to reduce the latency of flushing data to a data consumer. For example, FIG. 6 shows a flowchart of a method for reordering items in a downstream reorder buffer up to a timestamp identified in a punctuation event, according to an example embodiment. In an implementation, the method of flowchart 600 may be implemented by reorder buffer 318, watermark updater 314, and/or buffer flusher 316. FIG. 6 is described with continued reference to FIG. 3. Other structural and operational implementations will be apparent to persons skilled in the relevant art(s) based on the following discussion regarding flowchart 600 and system 300 of FIG. 3.

Flowchart 600 begins with step 602. In step 602, the punctuation event is obtained from the data store. For instance, with reference to FIG. 3, reorder buffer 318 may be configured to obtain 328 punctuation event 320 from a data store (e.g., data store 110A). As described earlier, punctuation event 320 may include the oldest timestamp that identifies the oldest time that any of upstream partitions 106A-106N flushed data to any of data stores 110A-110M. Reorder buffer 318 may obtain punctuation event 320 in a similar manner described above with respect to reorder buffer 318 obtaining data item 302 from the data store. For instance, reorder buffer 318 may obtain punctuation event 320 from data store 110A immediately upon one of data flushers 308 flushing punctuation event 320 to the data store (e.g., in real-time or near real-time).

In step 604, items of data in a reorder buffer are reordered up to the oldest timestamp identified in the punctuation event. For instance, with reference to FIG. 3, watermark updater 314 may be configured to update a watermark in reorder buffer 318 based on the oldest timestamp identified in punctuation event 320. Updating the watermark using the timestamp identified in punctuation event 320 may enable reorder buffer 318 to move the watermark to a point in time in which it is known that no data items will be received prior to the indicated timestamp. In other words, because each of partitions 106A-106N process items of data from data producing stream 102 in temporal order (e.g., in an increasingly monotonic fashion), and punctuation event 320 may represent the timestamp of the most recent output of the slowest performing upstream partition (irrespective of which data store 110A-110M to which the slowest moving partition may have most recently flushed an item of data), it can therefore be inferred that all data producers 122A-122P have at least progressed up to this point and that no upstream partition (including the slowest partition and any other upstream partition) may subsequently flush an item of data with a timestamp earlier than the timestamp indicated in punctuation event 320.

As a result, punctuation event 320 may indicate to each of downstream partitions 116A-116M a point in time up to which the set of items in each reorder buffer may be deemed complete. Thus, be reorder buffer 318 may reorder items of data in the buffer up to and including the updated watermark (e.g., the timestamp in the punctuation event).

As an illustrative example, a watermark in a reorder buffer of downstream partition 116A may indicate a timestamp based on the last instance of data received from a particular upstream partition (e.g., the slowest upstream partition a given point in time). If the particular upstream partition is still healthy and processing flushing items of data for ingestion by one or more of downstream partitions 116B-116M, the watermark in the reorder buffer of downstream partition 116A may not move since downstream partition 116A is not ingesting the more recent items of data processed by the upstream partition. However, since downstream partition 116A may receive punctuation event 320 that indicates the last time that the upstream partition flushed data to any data store 110A-110M, watermark updater 314 in downstream partition 116A may infer that the upstream partition has at least progressed up to the timestamp, and therefore move the watermark accordingly.

In step 606, reordered items of data in the reorder buffer are flushed to a data consumer. For instance, with reference to FIG. 3, buffer flusher 316 may be configured to flush items of data in the reorder buffer up to the updated watermark to data consumer 120. Buffer flusher 316 may flush data in various ways as will be appreciated by those skilled in the relevant art, such as by transmitting and/or storing the reordered items of data up to the updated watermark in a persistent storage that may be accessible by data consumer 120, including but not limited to a remote or cloud-based storage device, a storage device local to data consumer 120 (e.g., on the same computing device as the consumer), an optical disc or other physical media, or in any other persistent or non-volatile storage. It is also contemplated that buffer flusher 316 may transmit reordered items of data to other forms of storage, including non-persistent or volatile storages (e.g., random-access memory devices, data caches, etc.).

In this manner, when upstream partitions 106A-106N are healthy (e.g., continuously processing items of data correctly and/or not down due to a failure or the like), watermark updater 314 may be configured to move the watermark of reorder buffer 318 closer to real-time or near real-time, rather than waiting until the temporal divergence limit (e.g., ten minutes) of reorder buffer 318. In other words, items of data in the order buffer may be flushed up to the indicated timestamp in a such a manner that the temporal divergence of items of data remaining in the buffer (e.g., the time difference between the oldest and newest items remaining in the buffer) is less than the temporal divergence limit. In many instances, the temporal divergence of items of data remaining in the buffer may be significantly less by several magnitudes (e.g., seconds) compared to a temporal divergence limit that may be much larger. As a result, not only may buffer size and in-memory requirements be reduced to save system resources, but the latency in reordering and flushing items of data may be further reduced.

As described above, data reshuffling manager 108, data stores 108A-108M, timestamp ledger 112, and reorder buffer manager 118 may be configured to reshuffle a stream of data from data producing stream 102 in a manner that ensures data items are ordered correctly while not introducing significant additional latency in flushing data to the consuming entity. It is noted, however, that while some implementations may include all of the aforementioned components, some other implementations may include a subset thereof or only certain subcomponents described herein. For instance, a punctuation generation and transmitting entity may be provided in some implementations as a separate entity independent of other features described herein. Because there need not be runtime dependency between components of the upstream partitions and downstream partitions (aside from the temporal limit of the downstream reorder buffer which may be static in many instances), each of the upstream and downstream partitions may be maintained (e.g., started, stopped, upgraded, etc.) independently without affecting other partitions.

III. Example Mobile and Stationary Device Embodiments

Data producing stream 102, data producers 122A-122P, upstream data obtainer 104, upstream partitions 106A-106N, data reshuffling manager 108, timestamp ledger 112, data stores 110A-110M, downstream data receiver 114, downstream partitions 116A-116M, reorder buffer manager 118, data consumer 120, divergence limiter 304, data flushers 308A-308M, ledger updater 310, punctuation generator 312, reorder buffer 318, watermark updater 314, buffer flusher 316, flowchart 200, flowchart 400, flowchart 500, and/or flowchart 600 may be implemented in hardware, or hardware combined with software and/or firmware, such as being implemented as computer program code/instructions stored in a physical/hardware-based computer readable storage medium and configured to be executed in one or more processors, or being implemented as hardware logic/electrical circuitry (e.g., electrical circuits comprised of transistors, logic gates, operational amplifiers, one or more application specific integrated circuits (ASICs), one or more field programmable gate arrays (FPGAs)). For example, one or more of data producing stream 102, data producers 122A-122P, upstream data obtainer 104, upstream partitions 106A-106N, data reshuffling manager 108, timestamp ledger 112, data stores 110A-110M, downstream data receiver 114, downstream partitions 116A-116M, reorder buffer manager 118, data consumer 120, divergence limiter 304, data flushers 308A-308M, ledger updater 310, punctuation generator 312, reorder buffer 318, watermark updater 314, buffer flusher 316, flowchart 200, flowchart 400, flowchart 500, and/or flowchart 600 may be implemented separately or together in a SoC. The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 7:
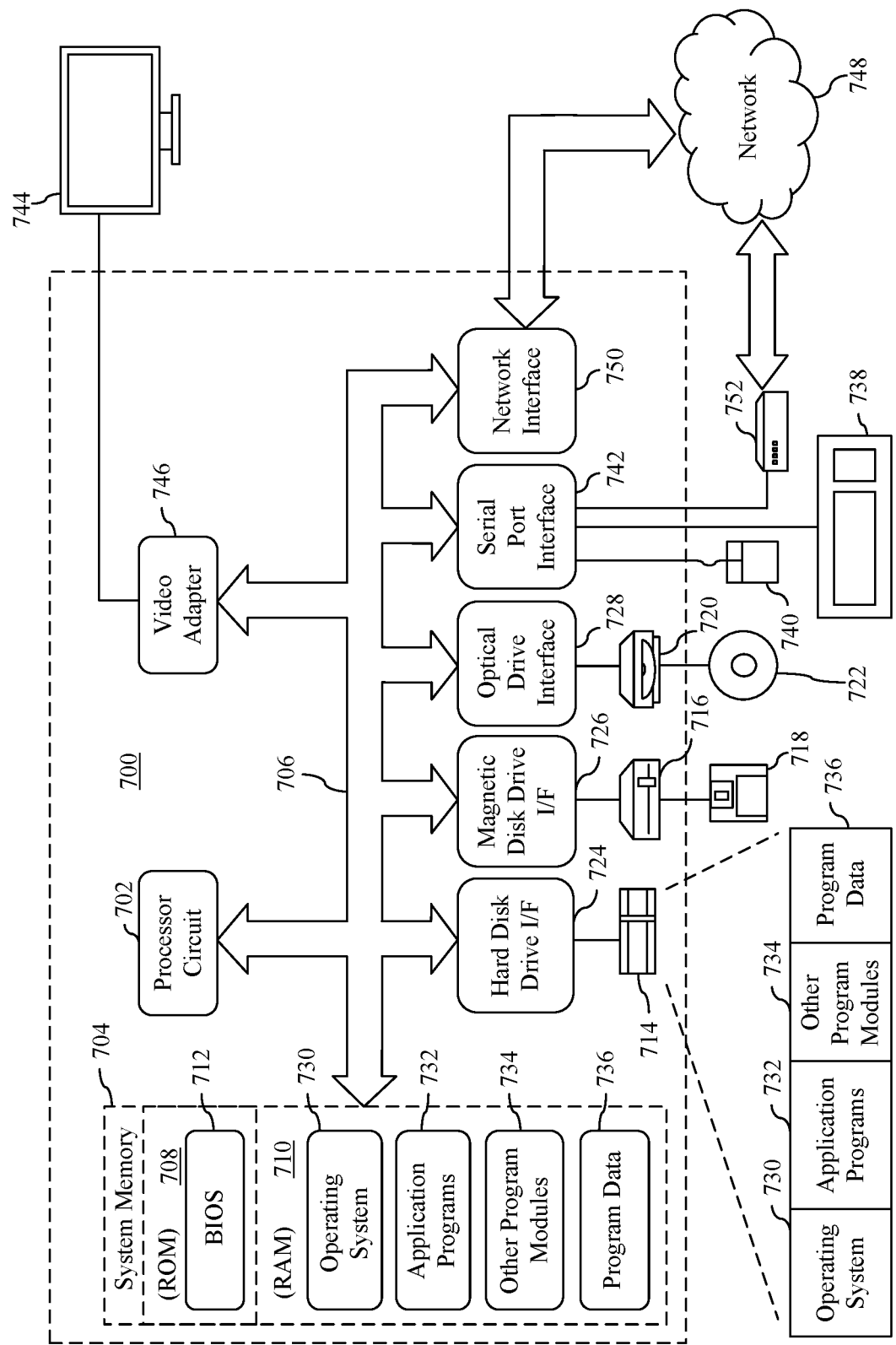
FIG. 7 shows a block diagram of an example computing device that may be used to implement example embodiments.

FIG. 7 depicts an exemplary implementation of a computing device 700 in which example embodiments may be implemented. For example, any of data producing stream 102, data producers 122A-122P, upstream data obtainer 104, upstream partitions 106A-106N, data reshuffling manager 108, timestamp ledger 112, data stores 110A-110M, downstream data receiver 114, downstream partitions 116A-116M, reorder buffer manager 118, data consumer 120, divergence limiter 304, data flushers 308A-308M, ledger updater 310, punctuation generator 312, reorder buffer 318, watermark updater 314, and/or buffer flusher 316 may be implemented in one or more computing devices similar to computing device 700 in stationary or mobile computer embodiments, including one or more features of computing device 700 and/or alternative features. The description of computing device 700 provided herein is provided for purposes of illustration, and is not intended to be limiting. Example embodiments may be implemented in further types of computer systems, as would be known to persons skilled in the relevant art(s).

As shown in FIG. 7, computing device 700 includes one or more processors, referred to as processor circuit 702, a system memory 704, and a bus 706 that couples various system components including system memory 704 to processor circuit 702. Processor circuit 702 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 702 may execute program code stored in a computer readable medium, such as program code of operating system 730, application programs 732, other programs 734, etc. Bus 706 represents one or more of any of several types of bus structures, including a memory bus or memory controller, a peripheral bus, an accelerated graphics port, and a processor or local bus using any of a variety of bus architectures. System memory 704 includes read only memory (ROM) 708 and random-access memory (RAM) 710. A basic input/output system 712 (BIOS) is stored in ROM 708.

Computing device 700 also has one or more of the following drives: a hard disk drive 714 for reading from and writing to a hard disk, a magnetic disk drive 716 for reading from or writing to a removable magnetic disk 718, and an optical disk drive 720 for reading from or writing to a removable optical disk 722 such as a CD ROM, DVD ROM, or other optical media. Hard disk drive 714, magnetic disk drive 716, and optical disk drive 720 are connected to bus 706 by a hard disk drive interface 724, a magnetic disk drive interface 726, and an optical drive interface 728, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 730, one or more application programs 732, other programs 734, and program data 736. Application programs 732 or other programs 734 may include, for example, computer program logic (e.g., computer program code or instructions) for implementing data producing stream 102, data producers 122A-122P, upstream data obtainer 104, upstream partitions 106A-106N, data reshuffling manager 108, timestamp ledger 112, data stores 110A-110M, downstream data receiver 114, downstream partitions 116A-116M, reorder buffer manager 118, data consumer 120, divergence limiter 304, data flushers 308A-308M, ledger updater 310, punctuation generator 312, reorder buffer 318, watermark updater 314, buffer flusher 316, flowchart 200, flowchart 400, flowchart 500, and/or flowchart 600 (including any suitable step of flowcharts 200, 400, 500, or 600) and/or further example embodiments described herein.

A user may enter commands and information into the computing device 700 through input devices such as keyboard 738 and pointing device 740. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 702 through a serial port interface 742 that is coupled to bus 706, but may be connected by other interfaces, such as a parallel port, game port, or a universal serial bus (USB).

A display screen 744 is also connected to bus 706 via an interface, such as a video adapter 746. Display screen 744 may be external to, or incorporated in computing device 700. Display screen 744 may display information, as well as being a user interface for receiving user commands and/or other information (e.g., by touch, finger gestures, virtual keyboard, etc.). In addition to display screen 744, computing device 700 may include other peripheral output devices (not shown) such as speakers and printers.

Computing device 700 is connected to a network 748 (e.g., the Internet) through an adaptor or network interface 750, a modem 752, or other means for establishing communications over the network. Modem 752, which may be internal or external, may be connected to bus 706 via serial port interface 742, as shown in FIG. 7, or may be connected to bus 706 using another interface type, including a parallel interface.

As used herein, the terms "computer program medium," "computer-readable medium," and "computer-readable storage medium" are used to refer to physical hardware media such as the hard disk associated with hard disk drive 714, removable magnetic disk 718, removable optical disk 722, other physical hardware media such as RAMs, ROMs, flash memory cards, digital video disks, zip disks, MEMs, nano-technology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media that are separate and non-overlapping with embodiments directed to computer-readable storage media.

As noted above, computer programs and modules (including application programs 732 and other programs 734) may be stored on the hard disk, magnetic disk, optical disk, ROM, RAM, or other hardware storage medium. Such computer programs may also be received via network interface 750, serial port interface 742, or any other interface type. Such computer programs, when executed or loaded by an application, enable computing device 700 to implement features of example embodiments described herein. Accordingly, such computer programs represent controllers of the computing device 700.

Example embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Example Embodiments

A system for processing a stream of data is disclosed herein. The system includes: one or more processors; and one or more memory devices that store program code configured to be executed by the one or more processors, the program code comprising: a divergence limiter configured to establish a maximum temporal divergence of a stream of data flushed to a data store from a plurality of upstream partitions; a plurality of data flushers, each data flusher corresponding to an upstream partition of the plurality of upstream partitions, each data flusher configured to: obtain an item of data from one or more data producers; determine whether flushing the data to the data store would exceed the maximum temporal divergence; and based at least on determining that flushing the data to the data store would not exceed the maximum temporal divergence, flush the data to the data store for ingestion by a downstream partition, and update a data structure to indicate a time associated with the item of data.

In one implementation of the foregoing system, the data store comprises a persistent data cube.

In another implementation of the foregoing system, items of data flushed to the data store are not necessarily ordered.

In another implementation of the foregoing system, the data structure comprises a table that is accessible to each upstream partition of the plurality of upstream partitions.

In another implementation of the foregoing system, the divergence limiter is further configured to: establish a temporal divergence limit of a plurality of reorder buffers, each reorder buffer corresponding to a downstream partition.

In another implementation of the foregoing system, the system further includes: a punctuation generator configured to, at a predetermined interval: identify an oldest timestamp in the data structure that indicates an oldest time that a partition among the plurality of upstream partitions flushed data to the data store; and transmit a punctuation event comprising the oldest timestamp to the data store for ingestion by a plurality of downstream partitions.

In another implementation of the foregoing system, each downstream partition comprises a reorder buffer configured to: obtain the punctuation event from the data store, and reorder items of data in the reorder buffer up to the oldest timestamp in the punctuation event; and the system further includes a buffer flusher configured to flush the reordered items of data in the reorder buffer to a data consumer, wherein a temporal divergence of remaining items of data in the reorder buffer is less than a temporal divergence limit of the reorder buffer.

A method for processing a stream of data is disclosed herein. The method includes: establishing a maximum temporal divergence of a stream of data flushed to a data store from a plurality of upstream partitions; obtaining, in each of a plurality of data flushers, an item of data from one or more data producers, each data flusher corresponding to an upstream partition of the plurality of upstream partitions; determining whether flushing the data to the data store would exceed the maximum temporal divergence; based at least on determining that flushing the data to the data store would not exceed the maximum temporal divergence: flushing the data to the data store for ingestion by a downstream partition, and updating a data structure to indicate a time associated with the item of data.

In one implementation of the foregoing method, the data store comprises a persistent data cube.

In another implementation of the foregoing method, items of data flushed to the data store are not necessarily ordered.

In another implementation of the foregoing method, the data structure comprises a table that is accessible to each upstream partition of the plurality of upstream partitions.

In another implementation of the foregoing method, the method further includes: establishing a temporal divergence limit of a plurality of reorder buffers, each reorder buffer corresponding to a downstream partition.

In another implementation of the foregoing method, the method further includes: identifying, at a predetermined interval, an oldest timestamp in the data structure that indicates an oldest time that a partition among the plurality of upstream partitions flushed data to the data store; and transmitting, at the predetermined interval, a punctuation event comprising the oldest timestamp to the data store for ingestion by a plurality of downstream partitions.

In another implementation of the foregoing method, the method further includes: obtaining the punctuation event from the data store; reordering items of data in a reorder buffer corresponding to a downstream partition up to the oldest timestamp in the punctuation event; and flushing the reordered items of data in the reorder buffer to a data consumer, wherein a temporal divergence of remaining items of data in the reorder buffer is less than a temporal divergence limit of the reorder buffer.

A computer-readable memory is disclosed herein. The computer-readable memory has computer program code recorded thereon that when executed by at least one processor causes the at least one processor to perform a method including: establishing a maximum temporal divergence of a stream of data flushed to a data store from a plurality of upstream partitions; obtaining, in each of a plurality of data flushers, an item of data from one or more data producers, each data flusher corresponding to an upstream partition of the plurality of upstream partitions; determining whether flushing the data to the data store would exceed the maximum temporal divergence; based at least on determining that flushing the data to the data store would not exceed the maximum temporal divergence: flushing the data to the data store for ingestion by a downstream partition, and updating a data structure to indicate a time associated with the item of data.

In one implementation of the foregoing computer-readable memory, items of data flushed to the data store are not necessarily ordered.

In another implementation of the foregoing computer-readable memory, the data structure comprises a table that is accessible to each upstream partition of the plurality of upstream partitions.

In another implementation of the foregoing computer-readable memory, the method further includes: establishing a temporal divergence limit of a plurality of reorder buffers, each reorder buffer corresponding to a downstream partition.

In another implementation of the foregoing computer-readable memory, the method further includes: identifying, at a predetermined interval, an oldest timestamp in the data structure that indicates an oldest time that a partition among the plurality of upstream partitions flushed data to the data store; and transmitting, at the predetermined interval, a punctuation event comprising the oldest timestamp to the data store for ingestion by a plurality of downstream partitions.

In another implementation of the foregoing computer-readable memory, the method further includes: obtaining the punctuation event from the data store; identifying the oldest timestamp in the punctuation event; reordering items of data in a reorder buffer corresponding a downstream partition up to the oldest timestamp in the punctuation event; and flushing the reordered items of data in the reorder buffer to a data consumer, wherein a temporal divergence of remaining items of data in the reorder buffer is less than a temporal divergence limit of the reorder buffer.

V. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A system for processing a stream of data, the system comprising:
   one or more processors; and
   one or more memory devices that store program code configured to be executed by the one or more processors, the program code comprising:
      a divergence limiter configured to establish a maximum temporal divergence of a stream of data flushed to a data store from a plurality of upstream partitions that each comprise a partition of data, the maximum temporal divergence being a largest permissible time difference between items of data flushed to the data store from any two upstream partitions of the plurality of upstream partitions;
      a plurality of data flushers configured to flush data to one or more data stores, each data flusher corresponding to an upstream partition of the plurality of upstream partitions, each data flusher configured to:
  obtain an item of data from one or more data producers;
  determine whether flushing the data to a respective data store would exceed the maximum temporal divergence; and
  based at least on determining that flushing the data to the respective data store would not exceed the maximum temporal divergence,
    flush the data to the respective data store for ingestion by a downstream partition, and
    update a data structure to indicate a timestamp associated with the flush of the item of data to the respective data store.

2. The system of claim 1, wherein the data store comprises a persistent data cube.

3. The system of claim 1, wherein items of data flushed to the data store are not necessarily ordered.

4. The system of claim 1, wherein the data structure comprises a table that is accessible to each upstream partition of the plurality of upstream partitions.

5. The system of claim 1, wherein the divergence limiter is further configured to:
  establish a temporal divergence limit of a plurality of reorder buffers, each reorder buffer corresponding to a downstream partition.

6. The system of claim 1, further comprising:
  a punctuation generator configured to, at a predetermined interval:
    identify an oldest timestamp in the data structure that indicates an oldest time that a partition among the plurality of upstream partitions flushed data to the respective data store; and
    transmit a punctuation event comprising the oldest timestamp to the respective data store for ingestion by a plurality of downstream partitions.

7. The system of claim 6, wherein each downstream partition comprises a reorder buffer configured to:
  obtain the punctuation event from the respective data store, and
  reorder items of data in the reorder buffer up to the oldest timestamp in the punctuation event; and
  wherein the system further comprises a buffer flusher that is configured to flush the reordered items of data in the reorder buffer to a data consumer, wherein a temporal divergence of remaining items of data in the reorder buffer is less than a temporal divergence limit of the reorder buffer.

8. A method for processing a stream of data, the method comprising:
  establishing a maximum temporal divergence of a stream of data flushed to a data store from a plurality of upstream partitions that each comprise a partition of data, the maximum temporal divergence being a largest permissible time difference between items of data flushed to the data store from any two upstream partitions of the plurality of upstream partitions;
  obtaining, in each of a plurality of data flushers configured to flush data to one or more data stores, an item of data from one or more data producers, each data flusher corresponding to an upstream partition of the plurality of upstream partitions;
  determining whether flushing the data to a respective data store would exceed the maximum temporal divergence;
  based at least on determining that flushing the data to the respective data store would not exceed the maximum temporal divergence:
    flushing the data to the respective data store for ingestion by a downstream partition, and
    updating a data structure to indicate a timestamp associated with the flush of the item of data to the respective data store.

9. The method of claim 8, wherein the data store comprises a persistent data cube.

10. The method of claim 8, wherein items of data flushed to the data store are not necessarily ordered.

11. The method of claim 8, wherein the data structure comprises a table that is accessible to each upstream partition of the plurality of upstream partitions.

12. The method of claim 8, further comprising:
  establishing a temporal divergence limit of a plurality of reorder buffers, each reorder buffer corresponding to a downstream partition.

13. The method of claim 8, further comprising:
  identifying, at a predetermined interval, an oldest timestamp in the data structure that indicates an oldest time that a partition among the plurality of upstream partitions flushed data to the respective data store; and
  transmitting, at the predetermined interval, a punctuation event comprising the oldest timestamp to the respective data store for ingestion by a plurality of downstream partitions.

14. The method of claim 13, further comprising:
  obtaining the punctuation event from the respective data store;
  reordering items of data in a reorder buffer corresponding to a downstream partition up to the oldest timestamp in the punctuation event; and
  flushing the reordered items of data in the reorder buffer to a data consumer, wherein a temporal divergence of remaining items of data in the reorder buffer is less than a temporal divergence limit of the reorder buffer.

15. A computer-readable memory having computer program code recorded thereon that when executed by at least one processor causes the at least one processor to perform a method comprising:
  establishing a maximum temporal divergence of a stream of data flushed to a data store from a plurality of upstream partitions that each comprise a partition of data, the maximum temporal divergence being a largest permissible time difference between items of data flushed to the data store from any two upstream partitions of the plurality of upstream partitions;
  obtaining, in each of a plurality of data flushers configured to flush data to one or more data stores, an item of data from one or more data producers, each data flusher corresponding to an upstream partition of the plurality of upstream partitions;
  determining whether flushing the data to a respective data store would exceed the maximum temporal divergence;
  based at least on determining that flushing the data to the respective data store would not exceed the maximum temporal divergence:
    flushing the data to the respective data store for ingestion by a downstream partition, and
    updating a data structure to indicate a timestamp associated with the flush of the item of data to the respective data store.

16. The computer-readable memory of claim 15, wherein items of data flushed to the data store are not necessarily ordered.

17. The computer-readable memory of claim 15, wherein the data structure comprises a table that is accessible to each upstream partition of the plurality of upstream partitions.

18. The computer-readable memory of claim 15, further comprising:
   establishing a temporal divergence limit of a plurality of reorder buffers, each reorder buffer corresponding to a downstream partition.

19. The computer-readable memory of claim 15, further comprising:
   identifying, at a predetermined interval, an oldest timestamp in the data structure that indicates an oldest time that a partition among the plurality of upstream partitions flushed data to the respective data store; and
   transmitting, at the predetermined interval, a punctuation event comprising the oldest timestamp to the respective data store for ingestion by a plurality of downstream partitions.

20. The computer-readable memory of claim 19, further comprising:
   obtaining the punctuation event from the respective data store;
   reordering items of data in a reorder buffer corresponding to a downstream partition up to the oldest timestamp in the punctuation event; and
   flushing the reordered items of data in the reorder buffer to a data consumer, wherein a temporal divergence of remaining items of data in the reorder buffer is less than a temporal divergence limit of the reorder buffer.

\* \* \* \* \*